(No Model.)
W. A. PENFIELD.
JOINT FOR MEMBERS OF BICYCLE FRAMES.
No. 573,695.          Patented Dec. 22, 1896.
Fig. 1.
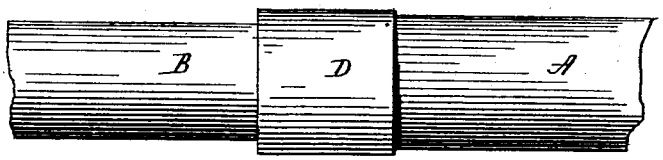
Fig. 2.
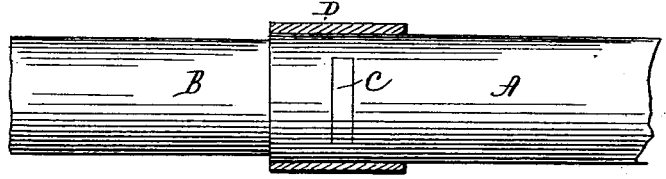
Fig. 3.
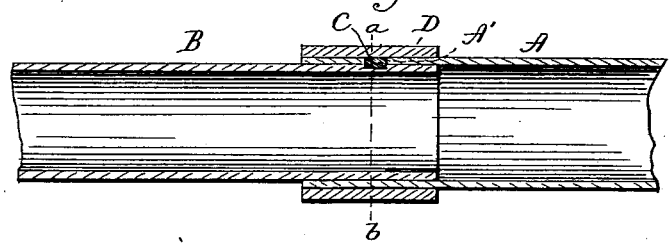
Fig. 6.    Fig. 4.    Fig. 5.      Fig. 7.
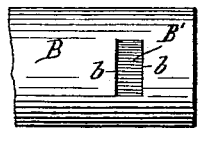 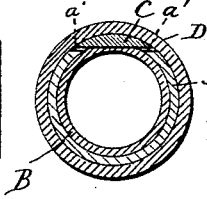 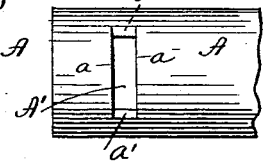 
Fig. 8.
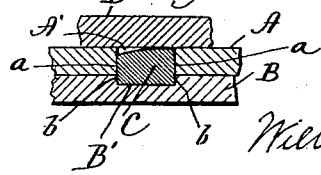
Witnesses.
J. H. Shumway
Lillian D. Kelsey
William A. Penfield,
Inventor.
By Attys.
Earle Seymour

United States Patent Office.

WILLIAM A. PENFIELD, OF MERIDEN, CONNECTICUT.

JOINT FOR MEMBERS OF BICYCLE-FRAMES.

SPECIFICATION forming part of Letters Patent No. 573,695, dated December 22, 1896.

Application filed August 17, 1896. Serial No. 602,953. (No model.)

*To all whom it may concern:*

Be it known that I, WILLIAM A. PENFIELD, of Meriden, in the county of New Haven and State of Connecticut, have invented a new Improvement in Joints for the Members of Bicycle-Frames; and I do hereby declare the following, when taken in connection with the accompanying drawings and the letters of reference marked thereon, to be a full, clear, and exact description of the same, and which said drawings constitute part of this specification, and represent, in—

Figure 1, a plan view of a joint constructed in accordance with my invention; Fig. 2, a similar view with the retaining-band in horizontal section; Fig. 3, a view in longitudinal vertical section through the key and slots of the joint; Fig. 4, a view in transverse section on the line $a\,b$ of Fig. 3; Fig. 5, a broken detached plan view of the outer tube, showing the locking-slot thereof; Fig. 6, a similar view of the inner tube, showing the locking-slot thereof; Fig. 7, a detached perspective view of the key; Fig. 8, an enlarged broken view, in transverse section, of the joint, plainly showing the engagement of the straight side walls of the key with the side walls or locking-shoulders of the slots of both tubes.

My invention relates to an improvement in joints for the members of bicycle-frames, and more particularly to frames composed of metallic tubes, but also applicable to frames composed of wood, the object being to produce at a comparatively low cost a simple, strong, and durable joint formed with particular reference to avoiding the expense and other objections incident to brazing tubular frames, to avoiding the finishing of the joints of such frames by filing or other treatment removing metal, whereby the parts are weakened, and to permitting the parts to be finished before they are joined and to be dismembered without destroying or disfiguring them after they are joined.

With these ends in view my invention consists in a joint having certain details of construction and combinations of parts, as will be hereinafter described, and pointed out in the claims.

For the illustration of my invention I have chosen to show the joining of two tubes A and B, the latter being adapted in exterior diameter to fit snugly or telescope within the former. In the end of the tube A, I form a transverse locking-slot A', opening inward and outward and having straight parallel side walls $a\,a$, which form locking-shoulders, and ends $a'\,a'$, which merely represent the thickness of the tube when cut at an angle other than a right angle. The end of the tube B is formed with a transverse slot B', corresponding in width to the slot A' and having straight parallel side walls forming locking-shoulders $b\,b$. As shown, this slot is not cut through the tube, although it may be, if preferred. When the two tubes are telescoped together, it is designed that these slots shall aline with each other and that the bottom of the slot B' shall stand above the ends $a'\,a'$ of the slot A', as shown in Fig. 4. These slots when thus alined receive a segmental key C, corresponding to them in width and having straight side walls which coact with the side walls or locking-shoulders $a\,a$ of the slot A' and the side walls or locking-shoulders $b\,b$ of the slot B for locking the tubes together against longitudinal displacement in either direction. The said key corresponds or approximately corresponds in length to the length of the slot A', while its outer face corresponds or approximately corresponds in curvature to the curvature of the tube A.

The inner face or bottom of the key is made flat and designed to rest upon the bottom of the slot B' and to clear the ends $a'\,a'$, which represent the bottom of the slot A'. The downward pressure of the key is therefore imposed entirely upon the inner tube, with the effect of expanding the same somewhat or springing it into a more intimate binding contact with the tube A. The key C is held in place by means of a retaining-band D, which is driven over the end of the tube A, whereby it forces the key inward and completes the joint.

For dismembering the two parts joined it is only necessary to drive off the retaining-band, after which the key may be plucked out of the slots and the two tubes readily drawn apart.

It will readily be seen that a joint constructed in accordance with my invention has the merit of simplicity, durability, and solidity. I also avoid the initial expense of brazing and the secondary expense of filing, which it is necessary to resort to to finish a brazed joint. Incidentally the filing of a brazed joint removes more or less metal and weakens the tubes. Under my invention both tubes may be finished and nickeled before they are joined, if desired, and after they are joined they may be separated without destroying or disfiguring either of them by simply driving off the retaining-band and plucking out the key, as before mentioned.

Although my improved joint was designed with particular reference to bicycles, it is obvious that it may be used in other situations where tubes are connected. In case my invention is applied to the construction of bicycle-frames composed of wooden members the end of one member will have to be formed with a socket to receive the end of the other member.

I would have it understood that I do not limit myself to the exact construction shown and described, but hold myself at liberty to make such changes and alterations as fairly fall within the spirit and scope of my invention.

Having fully described my invention, what I claim as new, and desire to secure by Letters Patent, is—

1. In a joint for the members of tubular bicycle-frames, the combination with two tubes, adapted in size to have their ends telescoped together, and each constructed with a transverse slot; of a segmental key adapted to fit into the said slots, and engage with the side walls or locking-shoulders thereof for preventing the tubes from being longitudinally displaced in either direction; and a retaining-band applied over the key for forcing it inward and holding it in place.

2. In a joint for the members of tubular bicycle-frames, the combination with two tubes adapted in size to have their ends telescoped together, and each constructed with a transverse slot of which the bottom wall of the slot in the smaller tube extends slightly above the ends of the slot in the larger tube; of a segmental key fitting into both of the said slots, and coacting with the side walls or locking-shoulders thereof to hold the two tubes against longitudinal displacement in either direction, and bearing upon the bottom of the slot in the smaller tube so as to spring the said tube into a more intimate binding contact with the outer tube; and a retaining-band frictioned over the end of the larger tube, and forcing the key inward and holding it in place.

3. In a joint, the combination with two members the end of one of which is adapted to be inserted into the end of the other, and each member being constructed with a transverse slot of which the slot of the outer member opens downward into the slot of the other member; of a segmental key adapted to fit into the said slots and engage with the side walls or locking-shoulders thereof for preventing the two members from being longitudinally displaced in either direction, and a retaining-band applied over the key for forcing it inward and holding it in place.

In testimony whereof I have signed this specification in the presence of two subscribing witnesses.

WILLIAM A. PENFIELD.

Witnesses:
W. J. ROBINSON,
ELMER R. LEWIS.